(12) United States Patent
Fimeri et al.

(10) Patent No.: US 7,390,102 B2
(45) Date of Patent: Jun. 24, 2008

(54) VEHICLE EXTERNAL REAR VIEW MIRROR WITH INTEGRAL PIVOT DETENT ASSEMBLY

(75) Inventors: Garry Gordon Leslie Fimeri, Morphett Vale (AU); Mark Olijnyk, Lonsdale (AU)

(73) Assignee: Schefenacker Vision Systems Australia Pty Ltd, Lonsdale, South Australia (AU)

( * ) Notice: Subject to any disclaimer, the term of this patent is extended or adjusted under 35 U.S.C. 154(b) by 74 days.

(21) Appl. No.: 11/133,586

(22) Filed: May 20, 2005

(65) Prior Publication Data

US 2005/0259340 A1 Nov. 24, 2005

(30) Foreign Application Priority Data

May 20, 2004 (AU) ............................... 2004902669

(51) Int. Cl.
*G02B 7/182* (2006.01)
(52) U.S. Cl. ........................................ 359/879
(58) Field of Classification Search .......... 359/879, 359/872, 873, 871; 349/169; 347/224; 285/252
See application file for complete search history.

(56) References Cited

U.S. PATENT DOCUMENTS

| 5,841,594 | A | * | 11/1998 | Rothe | 359/841 |
| 5,993,017 | A | * | 11/1999 | Romas | 359/871 |
| 6,155,890 | A | * | 12/2000 | Gerberding | 439/835 |
| 6,276,805 | B1 | * | 8/2001 | Home et al. | 359/841 |
| 2002/0093197 | A1 | * | 7/2002 | Sedlmeier | 285/252 |

\* cited by examiner

*Primary Examiner*—Ricky Mack
*Assistant Examiner*—James C Jones

(57) ABSTRACT

A pivot and detent mechanism is disclosed. The mechanism includes: a base 30 for mounting on a vehicle; an arm 40 for supporting a mirror head 20, the arm 40 pivotally connected to the base 30 to allow angular movement of the head 20, the arm having spaced apart first and second flexible branches 44 and 44'; and a deploy detent recess and a cooperating detent member 46 set, the deploy detent member 46 engageable with the detent recess to hold the mirror head 20 with respect to the base 30 in a deployed position. The flexible branches 44 and 44' are resiliently movable with respect to each other to allow disengagement and engagement of the deploy detent member 46 from the detent recess upon the application of sufficient force to the mirror head 20 allowing the head 20 to move from the deployed position to a non-deployed position. An improved pre-loaded spring is also disclosed.

12 Claims, 11 Drawing Sheets

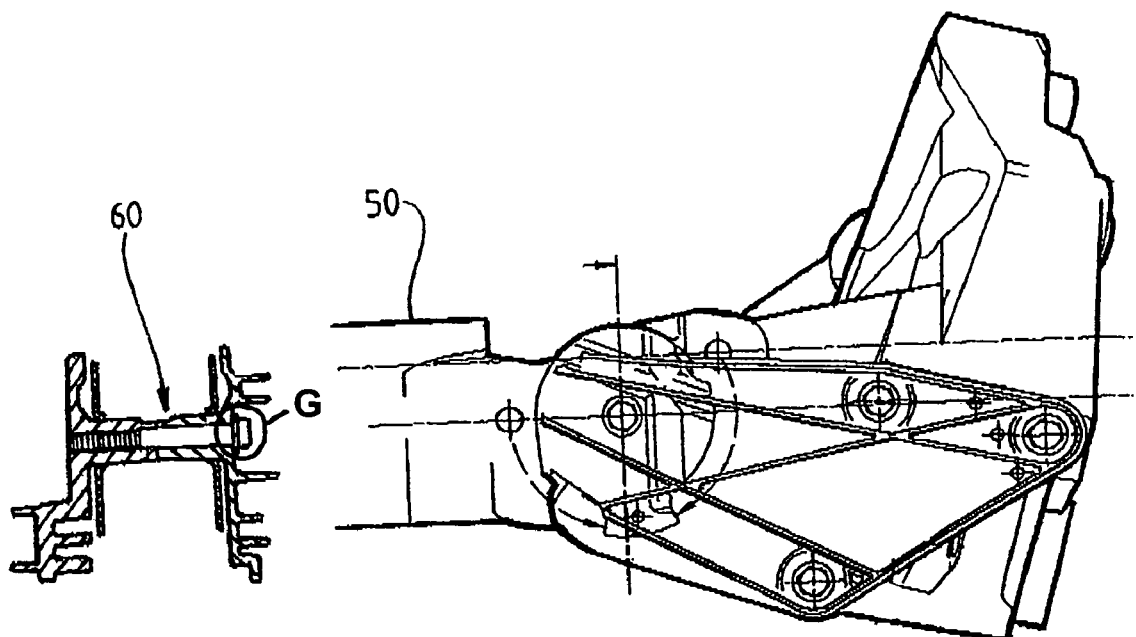
Fig 8        Fig 5
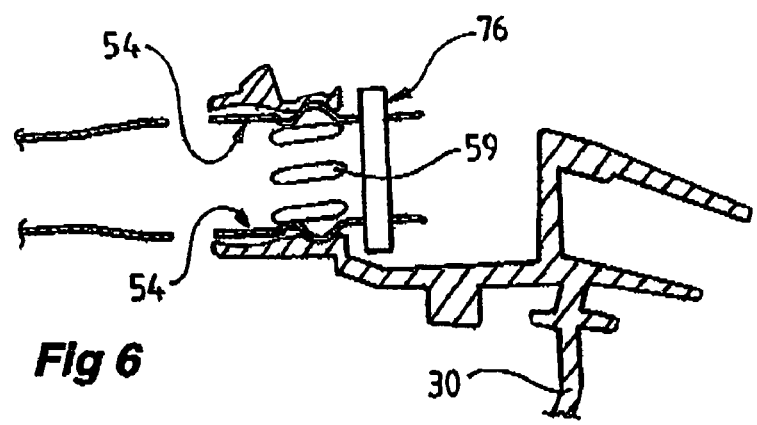
Fig 6
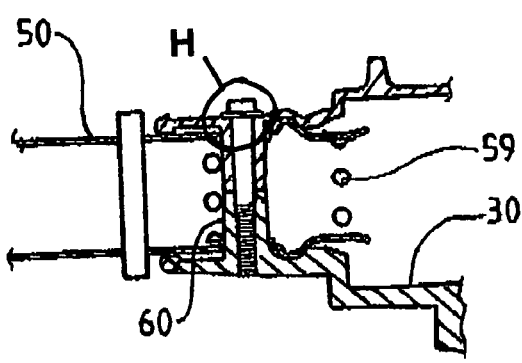
Fig 7

VEHICLE EXTERNAL REAR VIEW MIRROR WITH INTEGRAL PIVOT DETENT ASSEMBLY

CROSS-REFERENCE TO RELATED APPLICATIONS

This application claims priority to Australian Patent Application No. 2004902669 filed May 20, 2004.

FIELD OF THE INVENTION

The invention relates to vehicle external rear view mirror assemblies and their associated mechanisms and in particular to pivot and detent mechanisms for vehicle external mirror heads, such heads pivotably movable from a deployed position for use to a folded position alongside the vehicle door.

BACKGROUND

External rear view mirrors (wing mirrors) fitted to modern vehicles often form the widest part of the vehicle. The heads of these mirrors are usually designed to rotate about a substantially vertical pivot axis in both a forwards and a backwards direction. Such a mirror assembly is shown in FIG. 1.

Generally a detent mechanism is provided to hold the mirror head in its operable or deployed position. The detent mechanism holds the mirror head in a fixed relationship to the mirror bracket during normal operating use. Should the mirror head impact on an object, the detent mechanism allows the mirror head to "break away" to fold towards the vehicle.

Various detent mechanisms are known including the detent mechanism described within the applicant's issued U.S. Pat. No. 5,841,594 (Rothe).

It is an object of the present invention to provide an improved vehicle external rear view mirror assembly with a detent mechanism.

SUMMARY OF THE INVENTION

According to a first aspect of the invention there is provided a pivot and detent mechanism comprising:
  a base for mounting on a vehicle;
  an arm for supporting a mirror head, the arm having a proximal end pivotally connected to the base to allow angular movement of the mirror head with respect to the base, the proximal end having spaced apart first and second flexible branches; and
  a deploy detent recess and a cooperating detent member set, one of the deploy detent recess and the detent member within or on the base and the other on or within one of the branches of the arm, the deploy detent member engageable with the detent recess to hold the mirror head with respect to the base in a deployed position,
  wherein the flexible branches are resiliently movable with respect to each other to allow disengagement and engagement of the deploy detent member from the detent recess upon the application of sufficient force to the mirror head allowing the mirror head to move from the deployed position to a non-deployed position.

Preferably the mechanism further comprises a compression spring mounted between the branches of the arm, the spring biasing the first and second branches apart.

Preferably the spring is of generally U-shaped construction comprising:
  first and second bearing surfaces bearing against respective branches of the arm, the bearing surfaces biased away from each other such that the bearing surfaces provide a spring force when they are compressed towards each other; and
  a latch assembly extending between the bearing surfaces, the latch assembly holding the bearing surfaces against the spring force when a compression load applied to the spring is below a pre-load value.

Preferably the latch assembly of the spring comprises a pair of interlocking legs.

Preferably the mechanism further comprises a park detent recess, the detent member engageable with the park detent recess to hold the mirror head with respect to the base in a parked position.

Provision of a park position (fold position) detent recess prevents the mirror head moving away from the vehicle in a number of situations. For instance, when a vehicle is being transported on a (larger) vehicle, the park position detent recess and cooperating detent member will resist vibration forces that may otherwise cause the mirror to move out towards the deploy position. The park position detent recess is also of assistance in automatic car washing facilities.

Preferably the detent member extends laterally across the arm.

Preferably the mechanism further comprises a shaft mounted to the base, the shaft extending through holes through both the upper and lower branches, the holes and the shaft sized such that clearance between them is larger in a direction orthogonal to the detent member than in a direction parallel to the detent member.

The clearances described above result in the mirror arm's lateral movement being minimised while at the same time allowing the detent to properly engage with its deploy recess without the need for very precise manufacturing tolerances.

Preferably the mechanism comprises two detent recess and cooperating detent member sets, one set associated with the first flexible branch and the other associated with the second flexible branch.

According to a second aspect of the invention there is provided a pivot and detent mechanism comprising:
  a base for mounting on a vehicle;
  an upper and a lower arm for supporting a mirror head, each arm having a proximal end pivotally connected to the base to allow angular movement of the mirror head with respect to the base, each proximal end having spaced apart inner and outer flexible branches; and
  a deploy detent recess and a cooperating detent member set associated with each arm, one of the deploy detent recesses and the detent member of each set within/on the base and the other on/within one of the branches of its respective arm, the detent member engageable with the deploy detent recess to hold the mirror head with respect to the base in a deployed position,
  wherein the flexible branches are resiliently movable with respect to each other to allow disengagement and engagement of the detent members from the deploy detent recesses upon the application of sufficient force to the mirror head allowing the mirror head to move from the deployed position to a non-deployed position.

Preferably the mechanism further comprises a compression spring mounted between the branches of each arm, the springs biasing their respective first and second branches apart.

Preferably each spring is of generally U-shaped construction comprising:
  first and second bearing surfaces bearing against respective branches of its respective arm, the bearing surfaces biased away from each other such that the bearing surfaces provide a spring force when they are compressed towards each other; and a latch assembly extending between the bearing surfaces, the latch assembly holding the bearing surfaces against the spring force when a compression load applied to the spring is below a pre-load value.

Preferably the latch assembly of each spring comprises a pair of interlocking legs.

According to a third aspect of the invention there is provided a pre-loaded compression spring of generally U-shaped construction comprising:

first and second bearing surfaces, the bearing surfaces biased away from each other such that the bearing surfaces provide a spring force when they are compressed towards each other; and a latch assembly extending between the bearing surfaces, the latch assembly holding the bearing surfaces against the spring force when a compression load applied to the spring is below a pre-load value.

Preferably the latch assembly comprises a pair of interlocking legs.

Specific embodiments of the invention will now be described in some further detail with reference to and as illustrated in the accompanying figures. These embodiments are illustrative, and are not meant to be restrictive of the scope of the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

A preferred embodiment of the invention is illustrated in the accompanying representations in which:

FIG. 5 shows the upper portion of the assembly of FIG. 2 in plan view.

FIGS. 6 and 7 are sectional views through section lines A-A and B-B respectively, sections taken through FIG. 5.

FIG. 8 is a sectional view through the lines F-F shown in FIG. 5.

DETAILED DESCRIPTION OF THE DRAWINGS

Figure 1:
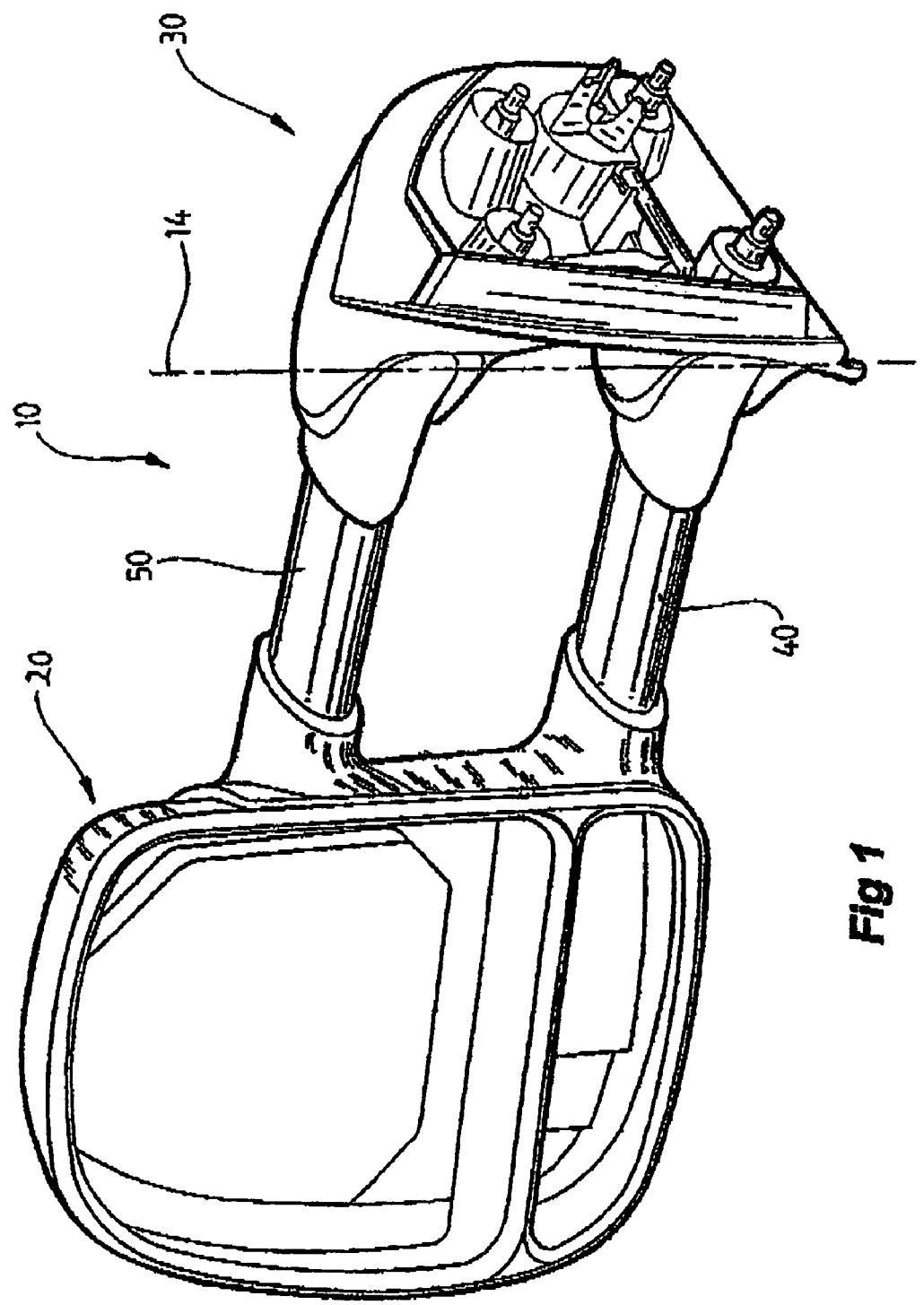
FIG. 1 is a perspective view of a dual arm vehicle external rear view mirror assembly.

FIG. 1 shows an external rear view mirror assembly 10, often referred to as a wing mirror, of the type commonly fitted to sport utility vehicles. Modern mirrors of this type have a pivot axis 14 about which the mirror head 15 rotates with respect to the base or bracket 30.

Figure 2:
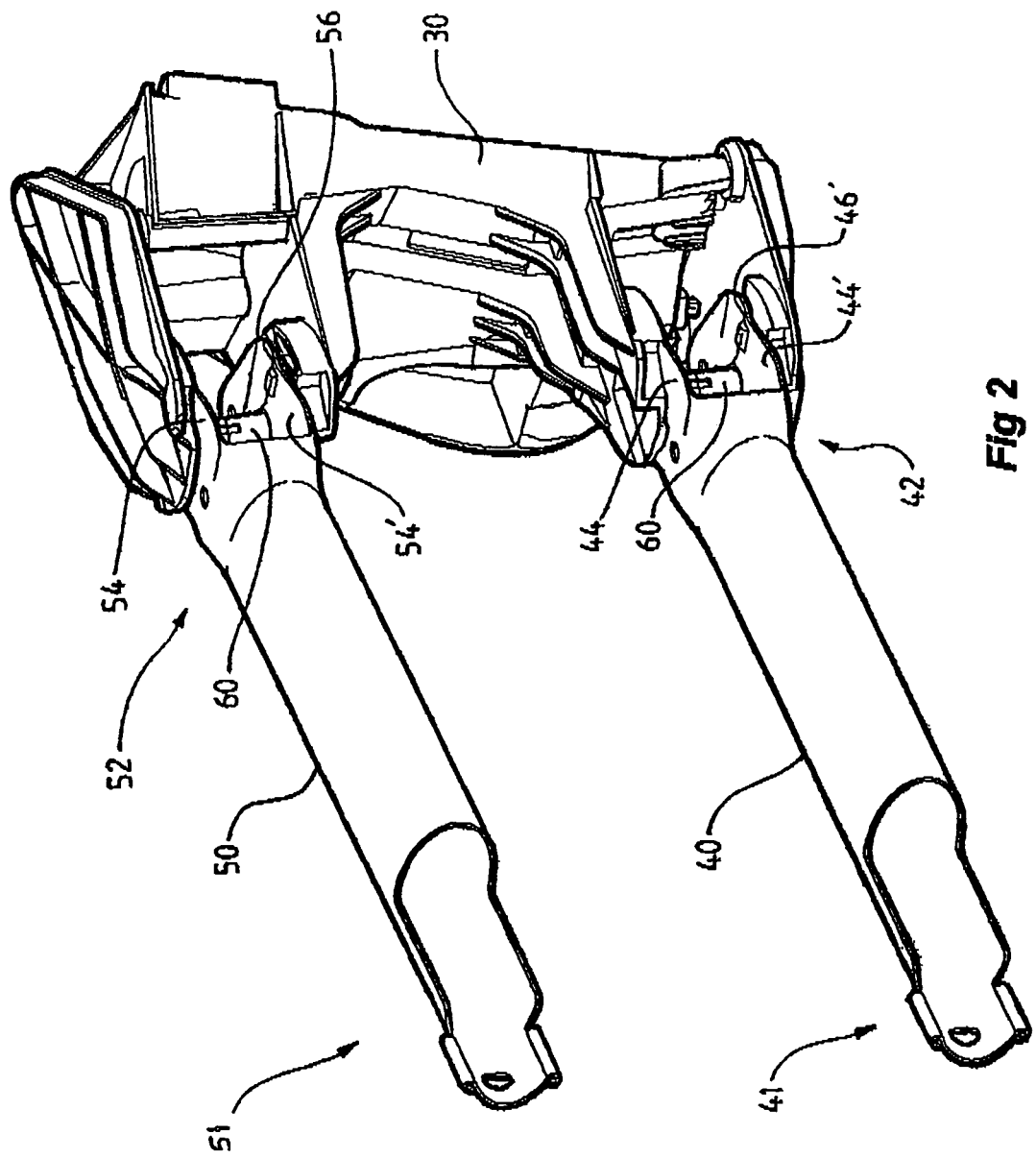
FIG. 2 is an isometric view of a pivot and detent mechanism for use between a vehicle and a vehicle external mirror head.

Referring now to FIG. 2, a pivot and detent mechanism for the type of mirror assembly shown in FIG. 1 is shown in an isometric view. The pivot and detent mechanism comprises a base 30 and a pair of spaced apart arms 40 and 50 for supporting a mirror head such as the mirror head 15 shown in FIG. 1.

The lower arm 40 has a distal end 41 for connection to a mirror head and a proximal end 42 pivotally connected to the base 30 to allow angular movement of the mirror head with respect to the base 30. The proximal end 42 has parallel spaced apart inner and outer flexible branches 44 and 44' respectively. These inner and outer (or first and second) flexible branches 44 and 44' are resiliently movable with respect to each other. Each branch is shaped to define a detent member which co-operates with a detent recess. For instance, outer branch 44 is shaped to define a detent member 46' that extends laterally across the arm 40 as is clearly shown in FIG. 2. This detent member 46' can either engage a deploy detent recess 32' or a park detent recess 34' as is most clearly shown in FIG. 3. In other embodiments of the invention, not illustrated, each branch maybe shaped to define a detent recess which co-operates with a detent member projecting from the base.

While in some applications of the invention a single arm with a single detent member and detent recess set may be provided, in other applications it will be desirable to provide a pair of arms such as the arms 40 and 50 of the embodiment illustrated in FIGS. 2 to 15.

Figure 3:
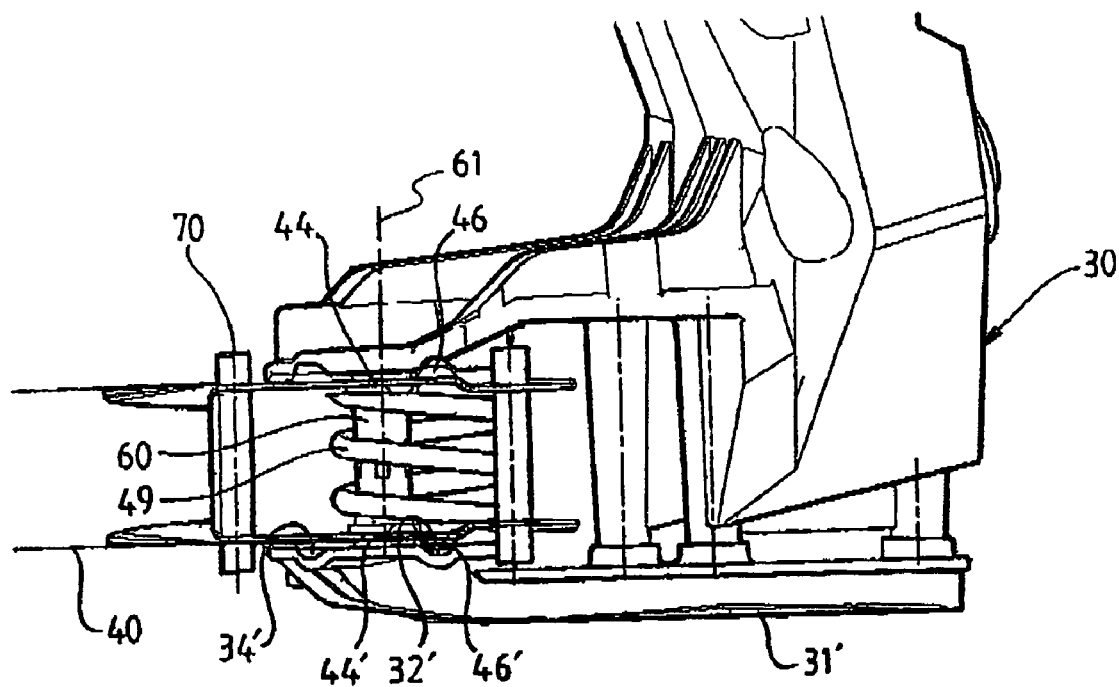
FIG. 3 is a partial side view of a lower portion of the assembly shown in FIG. 2 in its deployed position.
Figure 4:
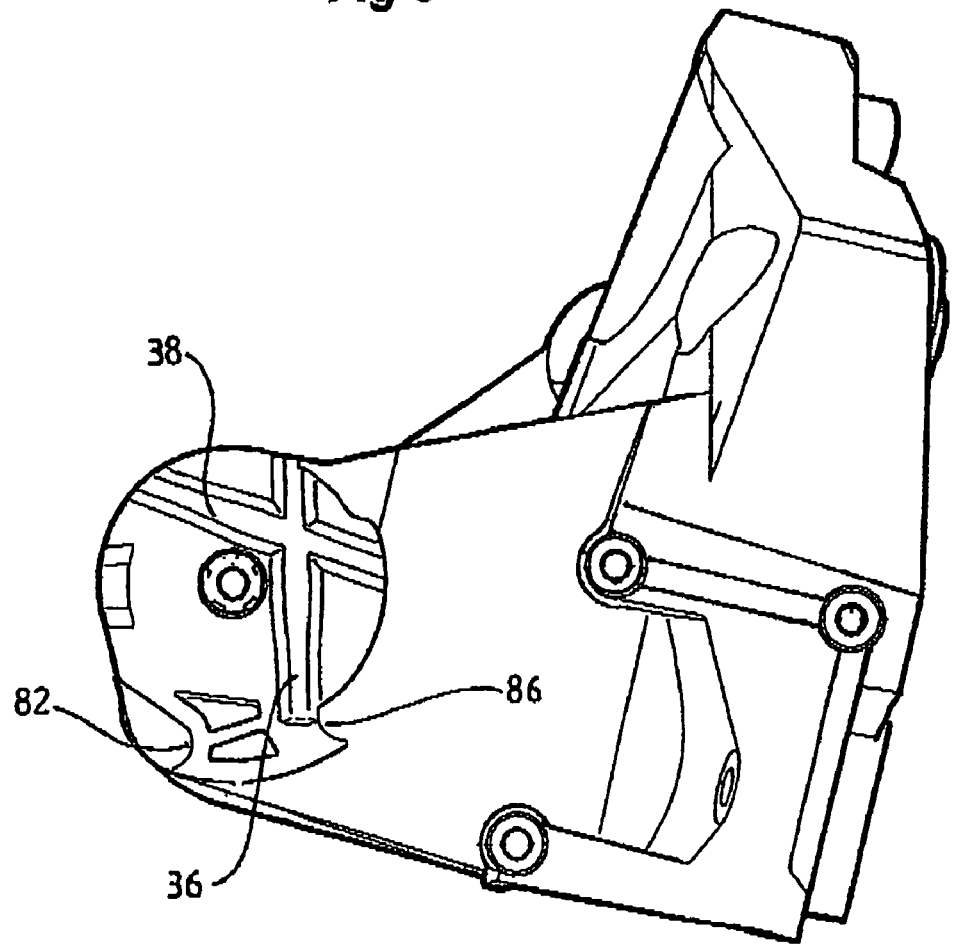
FIG. 4 shows an upper portion of the base of the assembly of FIG. 2 in plan view.

Referring to FIG. 3 it can be seen that with this embodiment of the invention, there is a detent recess and a co-operating detent member set associated with each of the branches 44 and 44' of the arm 40. With this embodiment a spring 49 provides force to bias the branches 44 and 44' apart.

In operation, as the mirror head and hence arms 40 and 50 are rotated, the flexible branches 54', 54, 44 and 44', best shown in FIG. 2, move resiliently with respect to each other to allow disengagement and engagement of the detent members 56', 56, 46 and 46' from the deploy detent recesses 36', 36, 32 and 32' upon the application of sufficient force to the mirror head allowing the mirror to move from its deployed position to a non-deployed position.

Park detent recesses 34', 34, 38 and 38' are provided to hold the arms 40 and 50 and hence the mirror head in a parked position. Park detent recess 38 and its associated deploy detent recess 36 are most clearly shown in FIG. 4.

Now referring to FIGS. 6, 7 and 8, the upper arm 50 is shown in its deployed position with respect to the base 30 in a plan view and in two cross-sectional views. In FIG. 6, an end stop pin 76 is shown. This pin 76 is provided to limit forward folding of the arms by abutment with a recess 86 most clearly shown in FIGS. 4 and 15.

Figure 9:
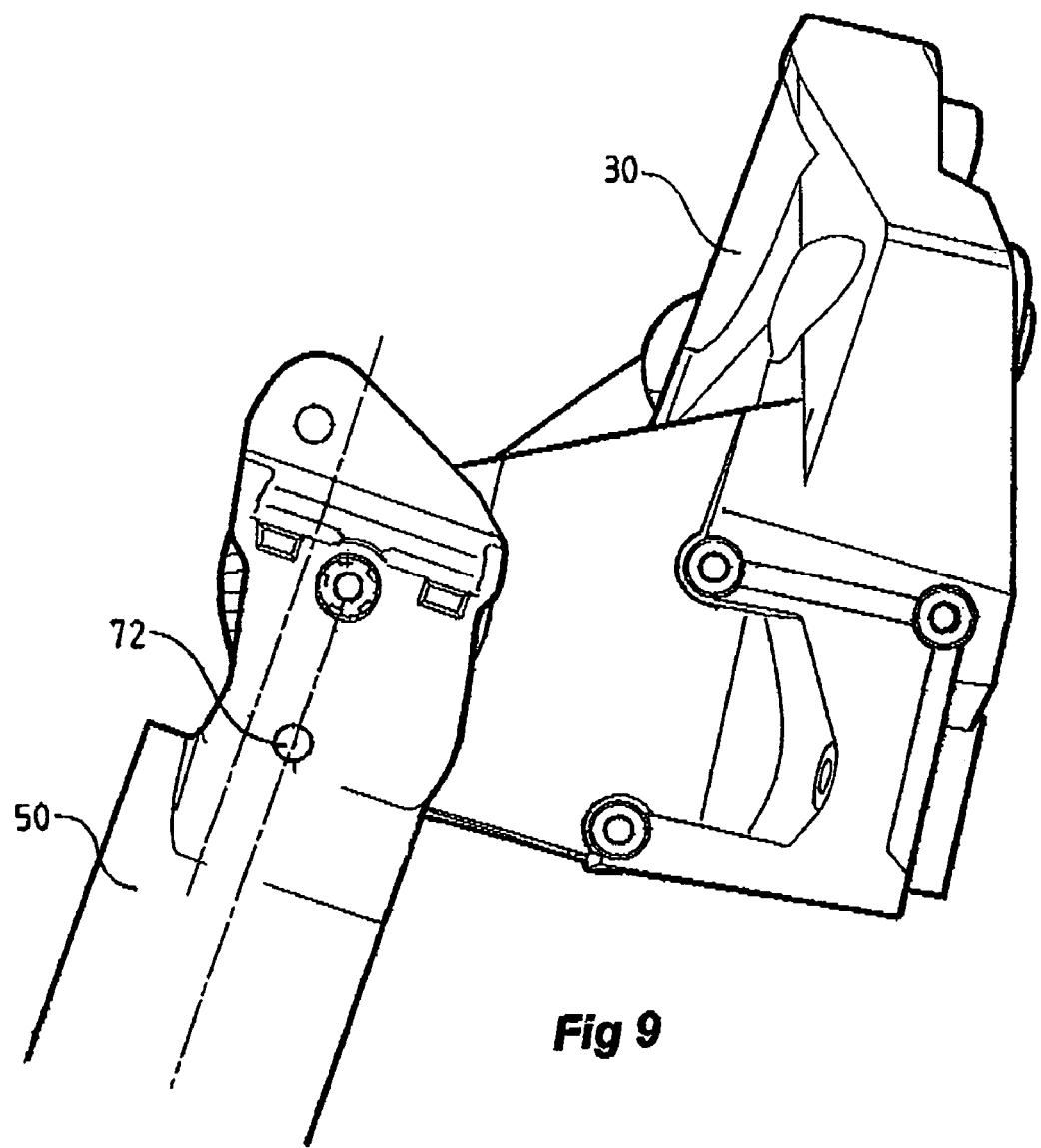
FIGS. 9 and 10 show the assembly of FIGS. 2 and 6 in a parked position.
Figure 10:
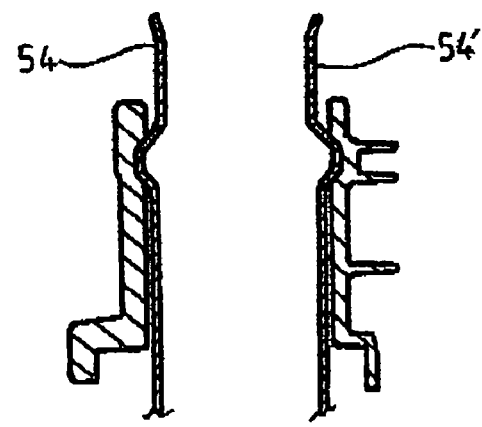

Now referring to FIGS. 9 and 10, the upper arm 50 is shown in its parked position with respect to the base 30. A park end stop pin 72 is provided to prevent excessive travel of the mirror head towards the side of the vehicle. The park end stop pin 72 abuts the park end stop recess 82 most clearly shown in FIG. 4.

Figure 11:
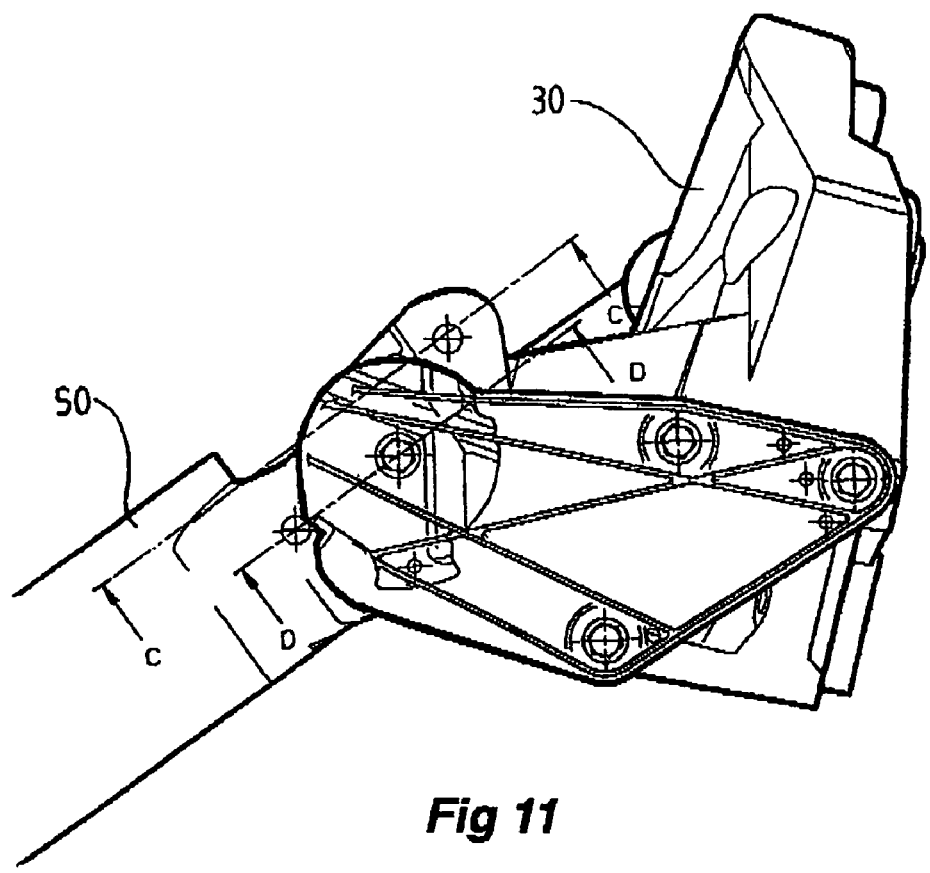
FIGS. 11, 12 and 13 show the assembly of FIG. 2 in a transitional position.
Figure 12:
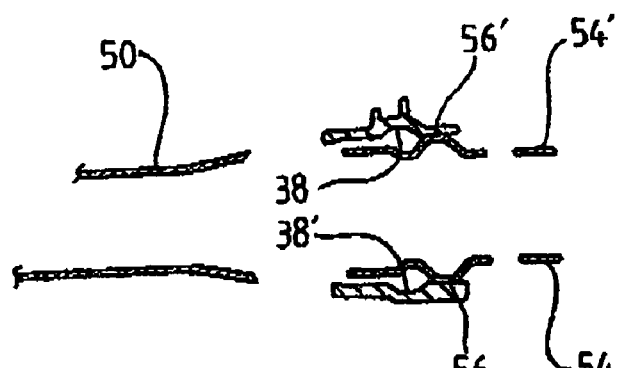
Figure 13:
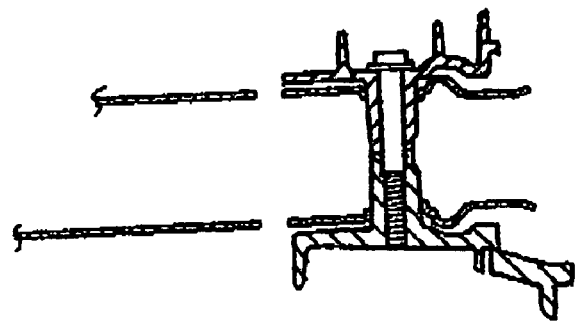
Figure 14:
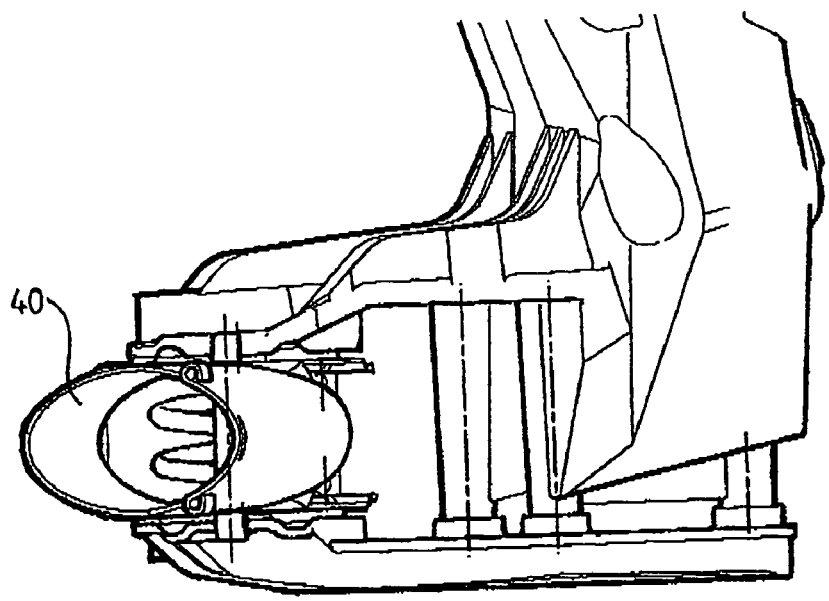
FIGS. 14 and 15 show the upper and lower portions respectively of the assembly of FIG. 2 in a forward folded position.
Figure 15:
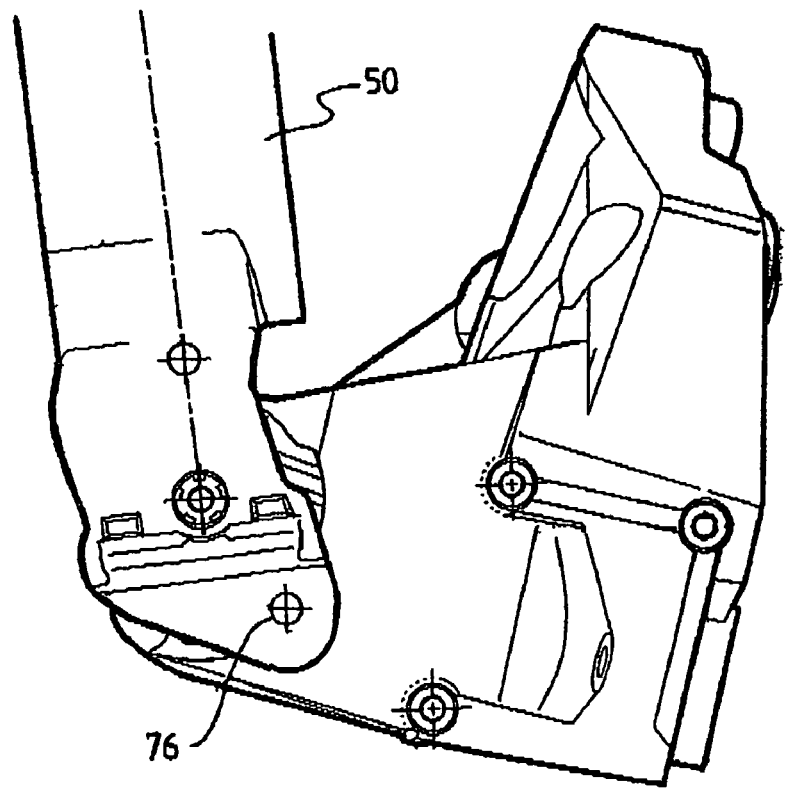

Now referring to FIGS. 11, 12 and 13, the upper arm 50 is shown in a transitional position between the deployed position shown in FIGS. 5 to 8 and the parked position is shown in FIGS. 9 and 10. FIG. 12 clearly shows that in the transitional position the detent members 56 and 56' have moved out of their detent recesses pushing the outer and inner branches 54' and 54 towards each other. Further movement through the transitional position to the parked position allows the detent members to move away from each other and into the detent recesses 38 and 38' shown in FIG. 12. The pivot and detent mechanism also allows the mirror head to move forward with respect to the base. FIGS. 14 and 15 show movement of the arms 40 and 50 in the forward fold position.

Figure 8A:
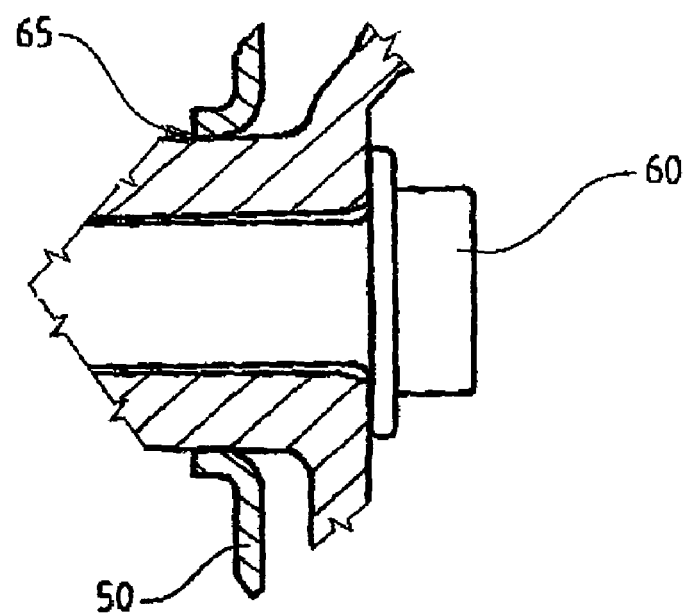
FIG. 8a is a detailed view of a portion of the section shown in FIG. 8 within circle G.
Figure 7A:
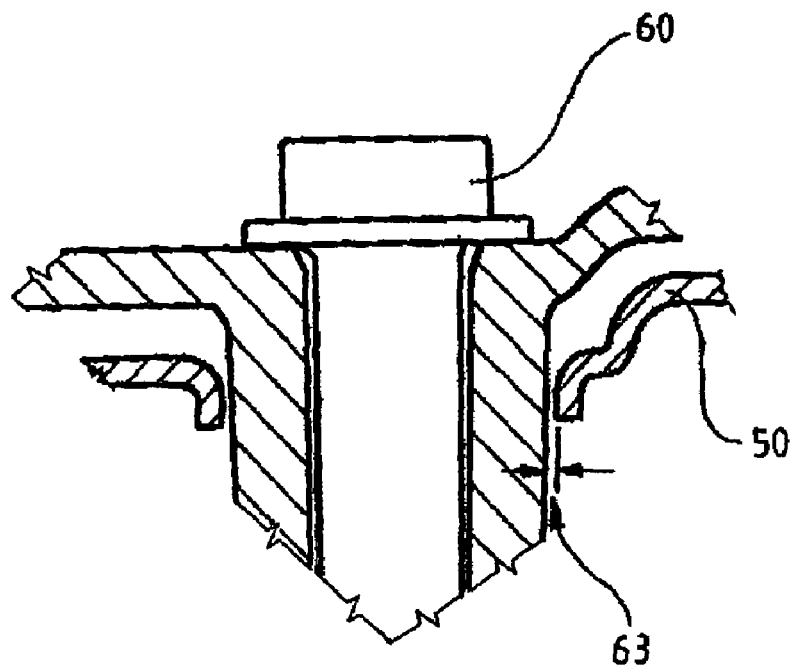
FIG. 7a is a detailed view of a portion of the section shown in FIG. 7 within circle H.

Referring now to FIGS. 7a and 8a, it can be seen that with the embodiment of the invention illustrated, the holes through the arms 40 and 50 and the shafts 60 are mutually sized such that the clearance between them is larger in a direction orthogonal to the detent member than in a direction parallel to the detent member. The additional clearance 63 shown in FIG. 7a allows the detent member to centre itself within the deploy detent recess without the arms 60 impeding the longitudinal movement of the arms 40 and 50. In contrast, the clearance 65 illustrated in FIG. 8a is somewhat smaller, providing a free running fit that minimises the lateral movement of the arms with respect to the base.

Figure 16A:
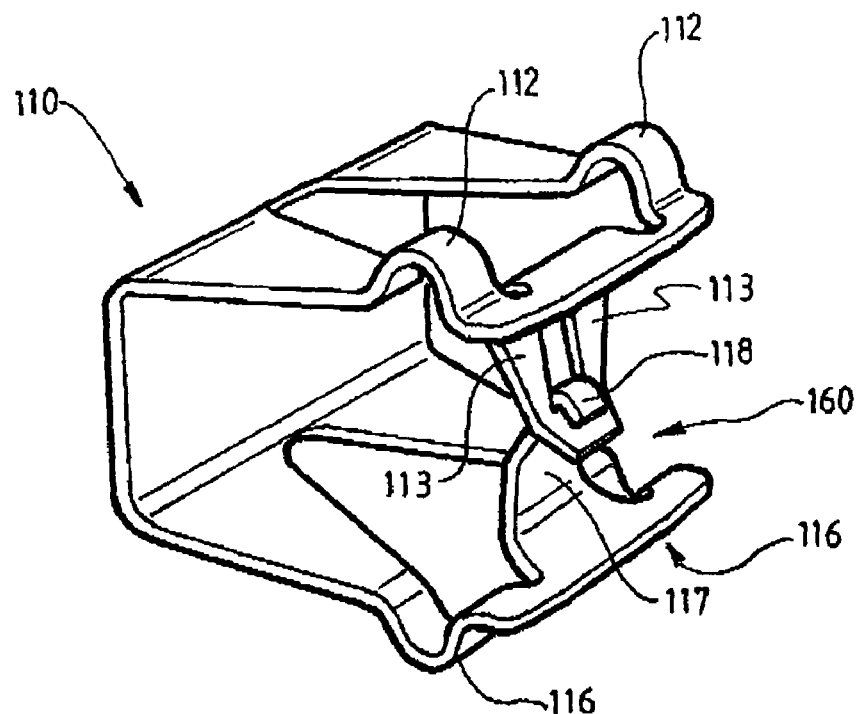
FIGS. 16a and 16b show a spring in a pre-compressed (pre-loaded) condition and in use (further compressed) position respectively.
Figure 16B:
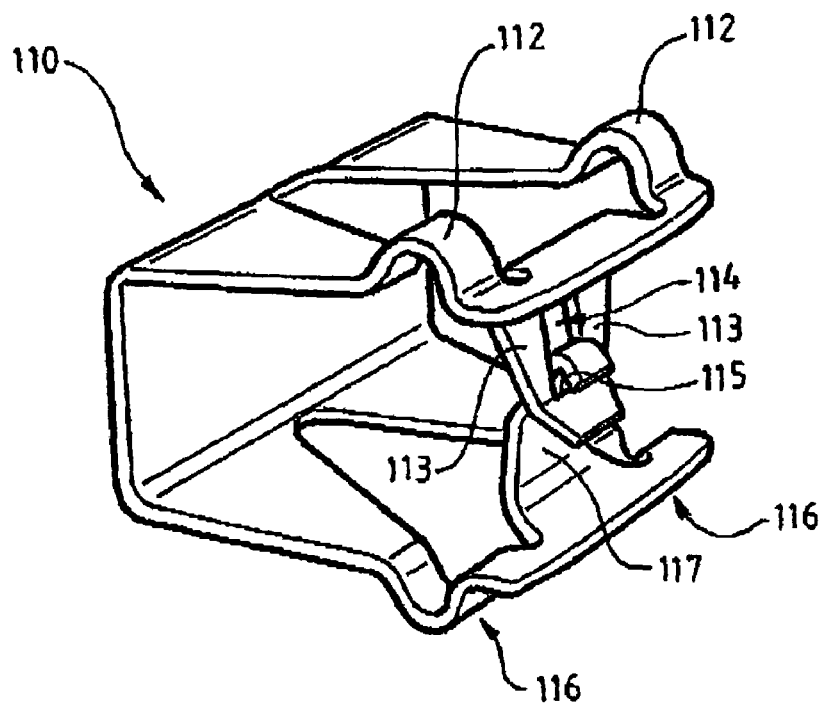
Figure 17:
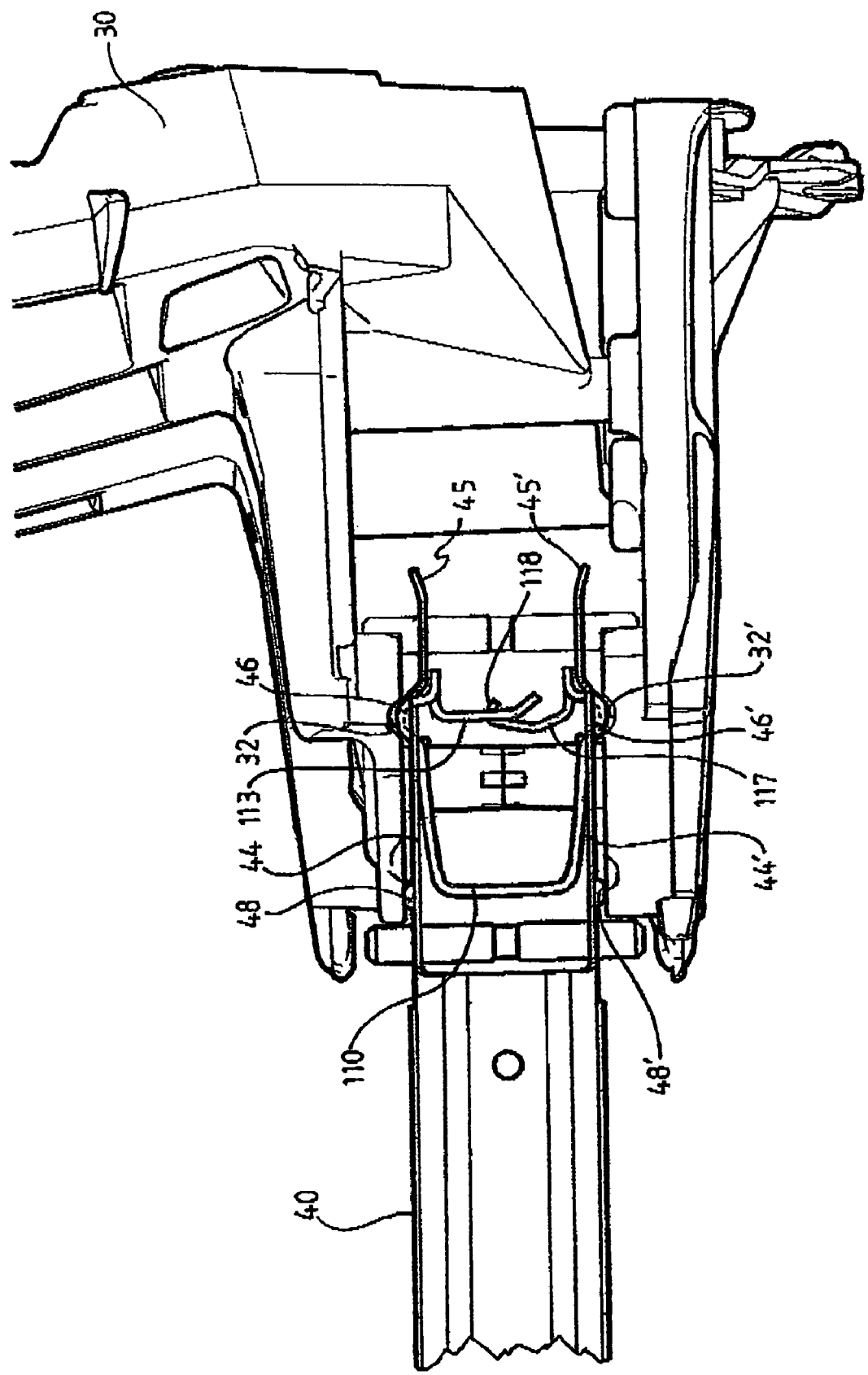
FIG. 17 is a similar view to FIG. 3 but shows an alternative embodiment of the invention in which the coil spring of FIG. 3 has been replaced with the spring of FIGS. 16a and 16b.

Referring now to FIG. 16a and 16b, an alternative spring 110 is shown to the spring 49 illustrated in FIG. 3. This spring 110 is preloaded compression spring of generally U-shaped construction. It comprises first and second bearing surfaces 112 and 116. The bearing surfaces 112 and 116 are shaped to fit within the concave reverse side of the detent members 46 and 46' as is shown in FIG. 17. The bearing surface is 112 and 116 are biased away from each other such that they provide a spring force when the are compressed towards each other. The spring 110 further comprises a latch assembly 160 that extends between the bearing surfaces 112 and 116. The latch assembly 160 holds the bearing surfaces 112 and 116 against the spring force when a compression load applied to the spring 110 is below a preload value. The latch assembly 160 comprises a pair of interlocking legs 113 and 117. FIGS. 16a and 16b show that the leg 117 of the latch assembly 160 terminates in a hook 118 and the leg 113 of the latch assembly 160 defines a slot 114 terminating in edge 115.

Without the latch assembly 160, and in order to generate a sufficient spring force, the spring 110 would be more open than is shown in FIG. 16a. The latch assembly 160 as described above holds the spring 110 in a preloaded and partially compressed condition as shown in FIG. 16a. This greatly facilitates assembly of the spring 110 in through the lead-in sections 45 and 45' of the arm 40 as show in FIG. 17. Importantly the latch assembly prevents the branches 44 and 44' at the arm 40 being excessively splayed outwardly and thus also facilitates assembly of the sub assembled arm 40 and spring 110 into the base 30.

Referring again to FIG. 17, projections 48 and 48' are shown these projections, projecting from the flexible branches 44 and 44' of the arm 40, helps centralise the arm 40 within the aperture of the (30) this improves the vibration performance of the mirror assembly shown in FIG. 1.

Figure 18:
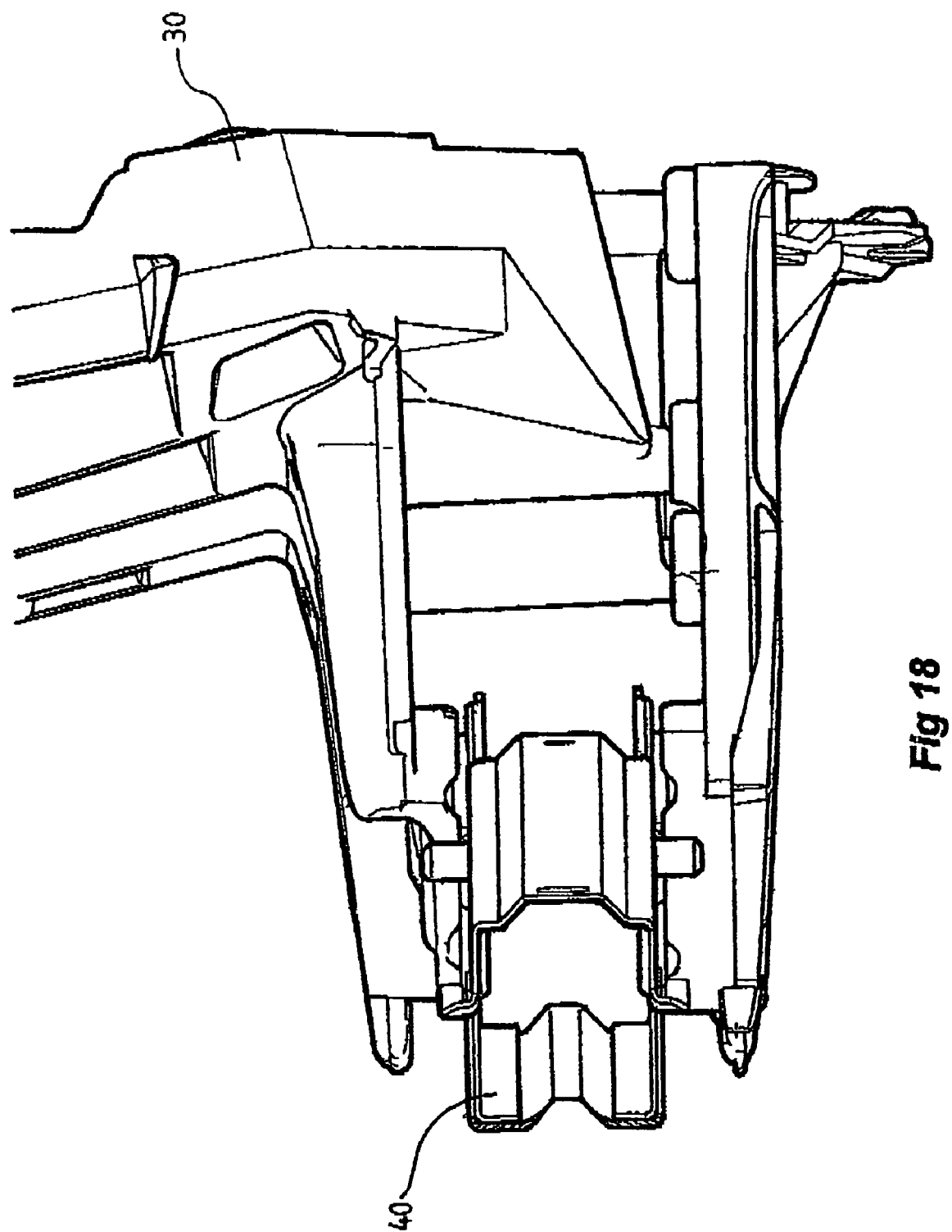
FIG. 18 is a similar view to that of FIG. 14, showing the alternative embodiment of the invention illustrated in FIG. 17.

Referring to FIG. 18, the cross-section of the arm 40 is different to that shown in FIGS. 1 to 15. In practice, any other arm cross-sections may be used with the invention.

While the present invention has been described in terms of a preferred embodiment in order to facilitate better understanding of the invention, it should be appreciated that various modifications can be made without departing from the principles of the invention. Therefore, the invention should be understood to include all such modifications within its scope.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pivot and detent mechanism comprising:
   a base for mounting on a vehicle;
   an arm for supporting a mirror head, the arm having a proximal end pivotally connected along a pivot axis to the base to allow angular movement of the mirror head with respect to the base, the proximal end having spaced apart first and second axially spaced flexible branches; and
   a deploy detent recess and a cooperating detent member set, one of the deploy detent recess and the detent member within or on the base and the other on or within one of the branches of the arm, the deploy detent member engageable with the detent recess to hold the mirror head with respect to the base in a deployed position,
   wherein the flexible branches are resiliently movable in an axial direction with respect to each other to allow disengagement and engagement of the deploy detent member from the detent recess upon the application of sufficient force to the mirror head allowing the mirror head to move from the deployed position to a non-deployed position.

2. A mechanism as claimed in claim 1 wherein the spring is of generally U-shaped construction comprising:
   a first and second bearing surfaces bearing against respective branches of the arm, the bearing surfaces biased away from each other such that the bearing surfaces provide a spring force when they are compressed towards each other; and
   a latch assembly extending between the bearing surfaces, the latch assembly holding the bearing surfaces against the spring force when a compression load applied to the spring is below a pre-load value.

3. A mechanism as claimed in claim 2 wherein the latch assembly of the spring comprises a pair of interlocking legs.

4. A mechanism as claimed in claim 2 comprising a park detent recess, the detent member engageable with the park detent recess to hold the mirror head with respect to the base in a parked position.

5. A mechanism as claimed in claim 4 wherein the detent member extends laterally across the arm.

6. A mechanism as claimed in claim 5 comprising a shaft mounted to the base, the shaft extending through holes through both the upper and lower branches, the holes and the shaft sized such that clearance between them is larger in a direction orthogonal to the detent member than in a direction parallel to the detent member.

7. A mechanism as claimed in claim 6 comprising two detent recess and cooperating detent member sets, one set associated with the first flexible branch and the other associated with the second flexible branch.

8. A pivot and detent mechanism comprising:
   a base for mounting on a vehicle;
   an upper and a lower arm for supporting a mirror head, each arm having a proximal end pivotally connected to the base along an axis to allow angular movement of the mirror head with respect to the base, each proximal end having axially spaced apart inner and outer flexible branches;

a spring mounted between the inner and outer flexible branches of each of the upper arm and lower arm for biasing the inner and outer flexible branches apart; and a deploy detent recess and a cooperating detent member set associated with each arm, one of the deploy detent recesses and the detent member of each set within/on the base and the other on/within one of the branches of its respective arm, the detent member engageable with the deploy detent recess to hold the mirror head with respect to the base in a deployed position, wherein the inner and outer flexible branches are resiliently movable in an axial direction with respect to each other to allow disengagement and engagement of the detent members from the deploy detent recesses upon the application of sufficient force to the mirror head allowing the mirror head to move from the deployed position to a non-deployed position.

9. A mechanism as claimed in claim 8 wherein each spring is of generally U-shaped construction comprising:

a first and second bearing surfaces bearing against respective branches of its respective arm, the bearing surfaces biased away from each other such that the bearing surfaces provide a spring force when they are compressed towards each other; and a latch assembly extending between the bearing surfaces, the latch assembly holding the bearing surfaces against the spring force when a compression load applied to the spring is below a pre-load value.

10. A mechanism as claimed in claim 9 wherein the latch assembly of each spring comprises a pair of interlocking legs.

11. A pre-loaded compression spring of generally U-shaped construction comprising:

a first and second bearing surfaces adapted to fit within respective detent members of a mirror assembly, the bearing surfaces biased away from each other such that the bearing surfaces provide a spring force when they are compressed towards each other; and a latch assembly extending between the bearing surfaces, the latch assembly holding the bearing surfaces against the spring force when a compression load applied to the spring is below a pre-load value.

12. A spring as claimed in claim 11 wherein the latch assembly comprises a pair of interlocking legs.

* * * * *